United States Patent [19]

Yang

[11] Patent Number: 5,294,494
[45] Date of Patent: Mar. 15, 1994

[54] PRINTED GLASS GRATING DECORATIVE PLATE

[75] Inventor: Dening Yang, Guangdong, China

[73] Assignee: Zhuhai S.E.Z. Optics Enterprise Ltd., Guangong, China

[21] Appl. No.: 966,955

[22] Filed: Oct. 27, 1992

[30] Foreign Application Priority Data

Oct. 29, 1991 [CN] China .................... 91108448.7

[51] Int. Cl.⁵ .................................... B32B 9/00
[52] U.S. Cl. ............................ 428/426; 428/195; 428/204; 428/206; 428/207; 428/432; 428/913.3; 283/86; 283/109; 283/110
[58] Field of Search ............... 428/195, 204, 206, 207, 428/426, 432, 913.3; 283/86, 110, 109

[56] References Cited

U.S. PATENT DOCUMENTS

| | | | |
|---|---|---|---|
| 4,213,926 | 7/1980 | Toyoda et al. | 428/914 |
| 4,600,627 | 7/1986 | Honda et al. | 428/203 |
| 4,856,857 | 8/1989 | Takeuchi et al. | 283/86 |
| 5,019,440 | 5/1991 | Ogasawara et al. | 428/195 |
| 5,047,282 | 9/1991 | Mier | 428/204 |
| 5,085,514 | 2/1992 | Mallik | 283/86 |
| 5,145,212 | 9/1992 | Mallik | 283/86 |

Primary Examiner—Patrick J. Ryan
Assistant Examiner—Abraham Bahta
Attorney, Agent, or Firm—Armstrong, Westerman, Hattori, McLeland & Naughton

[57] ABSTRACT

The present invention provides a novel printed glass grating decorative plate, to be used as building decorations, articles of daily use and furniture ornaments. It includes a glass plate coated by silk-screen printing technology with a layer of pattern in colored printing ink or of vitreous enamel, a layer of adhered transparent resin and a layer of resin in grating relief with reflexive metal film. This plate has not only an excellent quality of wear-resistance but also magnificent and attractive color effects.

22 Claims, 8 Drawing Sheets

Fig. 8 PRIOR ART
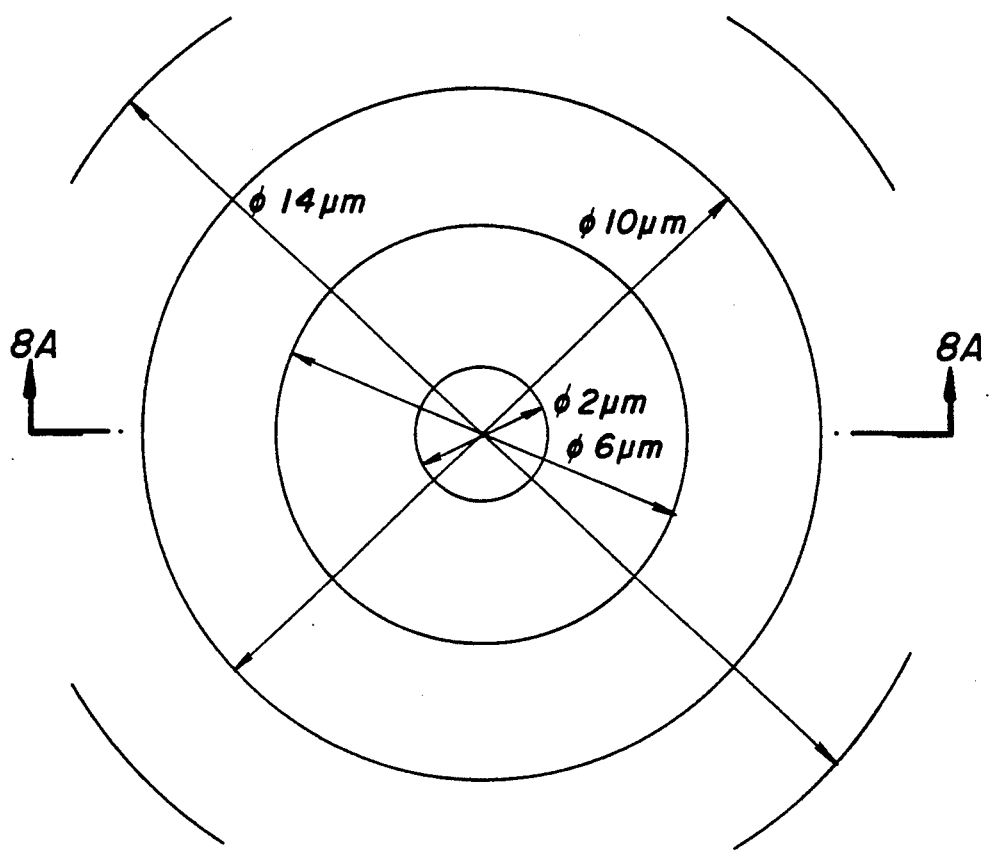
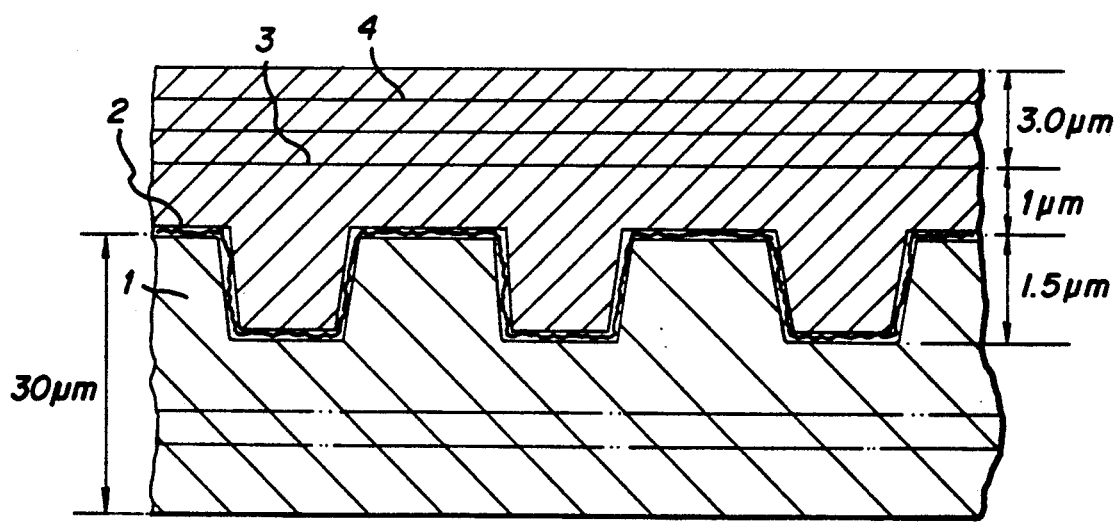
Fig. 8A PRIOR ART

PRINTED GLASS GRATING DECORATIVE PLATE

The present invention relates to a kind of decorative material, in particular, to a printed glass grating decorative panel for decorating a surface of a interior or exterior wall, floor plate in a building, or articles of everyday use and funiture.

Conventional holographic grating products can be grouped into two categories, the one is a layer of thermoplastic resin film, made by thermocompression mark technology, such as, the manufacture technology of preventing trade-mark counterfeit, the other is to apply a light-sensitive material over a plate of glass, made by optical processing technology. Still another is to apply a resin of cross-linking molecular structure to the glass by means of a lately-developed technology, made by grating die-casting technology. For example, Chinese Patent Application CN87103741A filed by the same applicant on Jun. 1, 1987 disclosed novel type construction decorative material, a holographic decorative brick. This decorative brick (cf. FIG. 7) is formed by imprinting a laser holographic or grating pattern on a substrate (1) made of, such as, transparent glass, glass epoxy or acrylic dope film, then coating it with a layer of highly corrosion resistant metal reflecting film (2), and finally applying to it a protective layer. Another example is Chinese Patent Application CN87105800A entitled "Holographic Grating Solar Film" filed by the same applicant on Aug. 28, 1987, which disclosed a novel type of decorative material. It can be seen from FIG. 8 that this decorative material is formed by coating a layer of dark brown resin (3) on the surface of a transparent plastic film, after heating to make it soften, imprinting a laser holographic or grating pattern on it, through a pattern plate or pattern roller reproduced from a dry plate processed by using laser hologram or grating photoetch technology, then coating it with a very thin layer of metal reflecting film (2) and applying a transparent pressure sensitive gel. However, the holographic or grating pattern of the above-mentioned products are too abstract and too monotonous to display a combined effect of hologram or grating and the designs and patterns of the marble, the granite or the ceramic tile. In addition, the ageing-resistance property thereof is poor. This is why the range of application for the conventional holographic grating products is so limited.

The object of the present invention is to provide a printed glass holographic grating decorative plate that can overcome the above-mentional shortcomings of prior arts, and present a artistic pattern of combining the magnificent optical effect of the grating with a senses of natural simple and plain seemed as if a marble or granite porphyry, and a colour hue of a tile or a printed glass. It has also the properties of fastness to light, heat resistance and durability that are indispensable for a construction material for the exterior wall.

The decorative material provided by the present invention comprises a colorless transparent glass, or coloured transparent glass in blue, dark brown, grey, yellow, green and red etc., or glass coated with heat reflecting metal film in various colour or strengthened glass as a substrate. The glass is at first coated by printing process with a layer of pattern in printing ink, the ink can be vitreous enamel or organic printing ink, and the pattern can be monochromatic or of various colours superposed or combined. After heating, baking or sintering, the pattern is adhered to the glass or fused to form a whole one. Then the printed surface or the naked side of the glass is adhered with a resinous layer of metal reflecting film with grating structure. Here the metal reflecting film layer with grating structure can be coated according to specific pattern requirement so that some portions of which without a metal film are a complete transparency, while the other portions of which present the pattern formed by the metal reflecting film grating. The thickness of the layer of metal film coating can be controlled to make its light transmissivity has a range of 10%~90% so as to meet the requirements of various designs. The adhesive material used may be a layer of light sensitive resin, a layer of pressure sensitive resin, or a layer of resin of cross-linking molecular structure. The grating resin layer with metal reflecting film layer can be a layer of resin of cross-linking molecular structure or a layer of thermoplastic resin. The resin used can be a transparent resin or a non-transparent resin. In order to strengthen the protection of the grating resin layer, a layer of glass or resin or any other solid-sheet material can be adhered to the resin layer of grating or holographic pattern in relief with metal reflecting film layer.

A preferred embodiment of the present invention will be described below in detail with reference to the accompanying drawings, in which:

FIGS. 7 and 8 show holographic grating products in the prior art.

Figure 1:
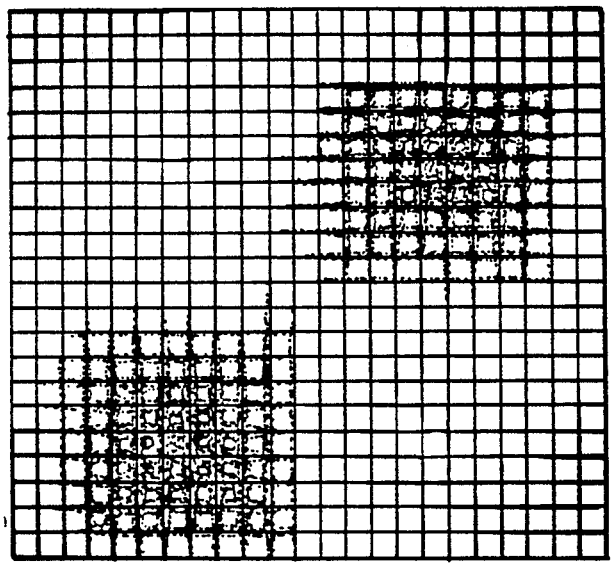
FIG. 1 is a plan diagrammatic view of a first embodiment of the printed glass grating decorative plate according to the present invention.
Figure 2:
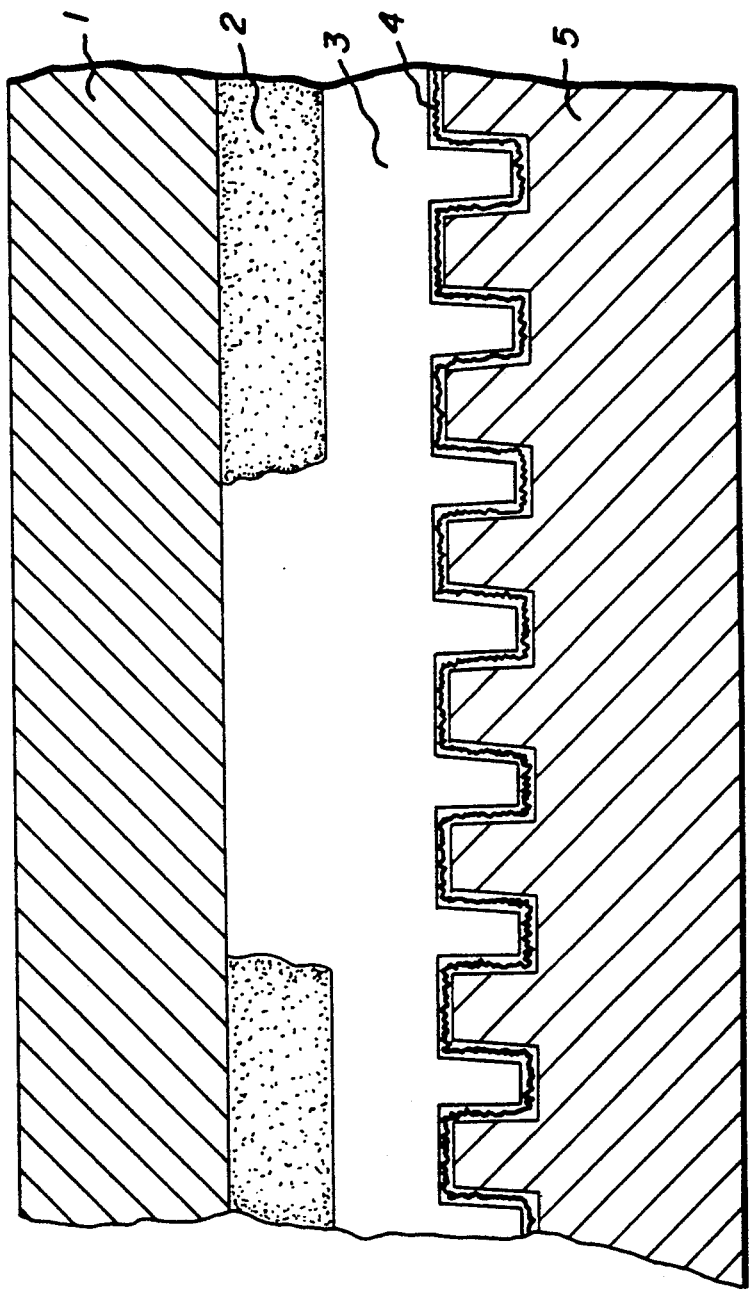
FIG. 2 is a sectional view of the decorative plate shown in FIG. 1.
Figure 3:
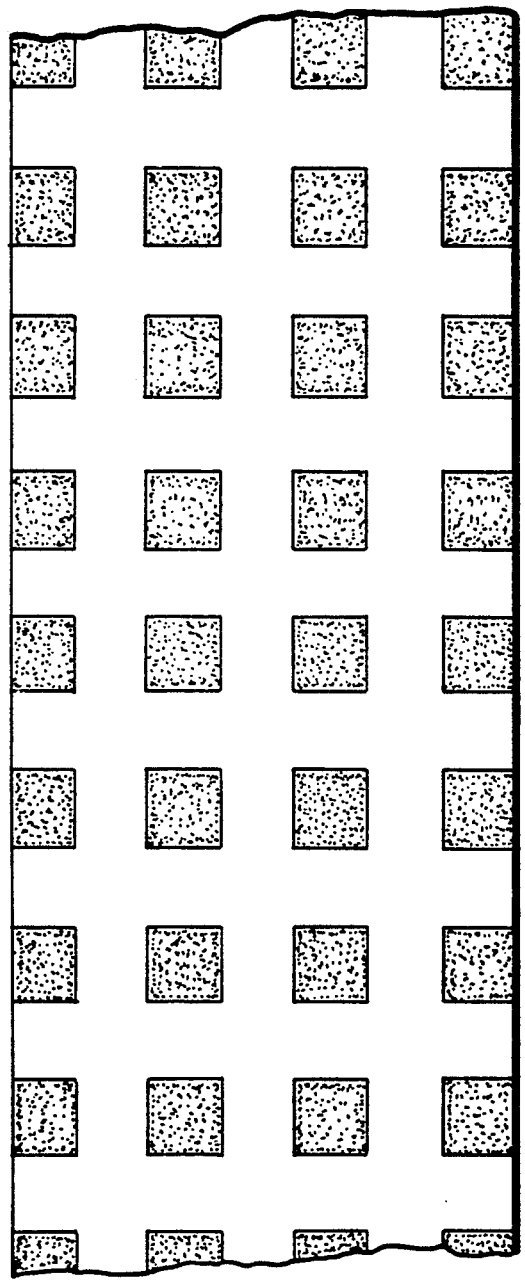
FIG. 3 is an enlarged plan diagrammatic view of the grating portion of the transparent glass without a coloured printing ink layer of the product shown in FIG. 1.

FIGS. 1, 2 and 3 show a first embodiment of the printed glass grating decorative plate of the present invention. Refering to FIG. 1 shown the substrate of the first embodiment, a 6 mm transparent glass plate, in which the black part is the pattern in black printing ink at the back, and the white part is the square grating and the metal reflecting layer part visible at the back of the glass. It can be seen from FIG. 2 that the decorative plate is composed of a plane transparent glass (1), a layer of black printing ink (2), a layer of adhered transparent epoxy resin (3), a layer of metal reflecting film (4), and a protective resin layer in grating relief (5). FIG. 3 shows the grating part of the transparent glass of the decorative panel without a printing ink layer. From the drawing can be seen the square gratings distributed all over with a spacing of 2 microns, the black part being the depressed portion of the relief.

The manufacturing process of the decorative plate is as follows:

A layer of pattern in black printing ink (2) is imprinted on the plate glass (1) by means of printing technology. After solidifying it by heating, the printed surface is processed to have a layer of adhered transparent resin (3). Then, the laminated product is coated with a protective resin layer in grating relief with reflexive metal film (4). After the resin is solidified, a final product of printed glass grating decorative plate is obtained.

Figure 4:
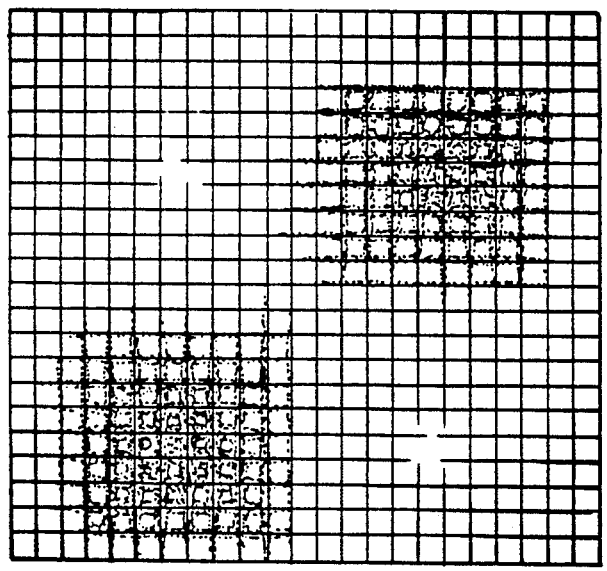
FIG. 4 is a plan diagrammatic view of a second embodiment of the printed glass grating decorative plate according to the present invention.
Figure 5:
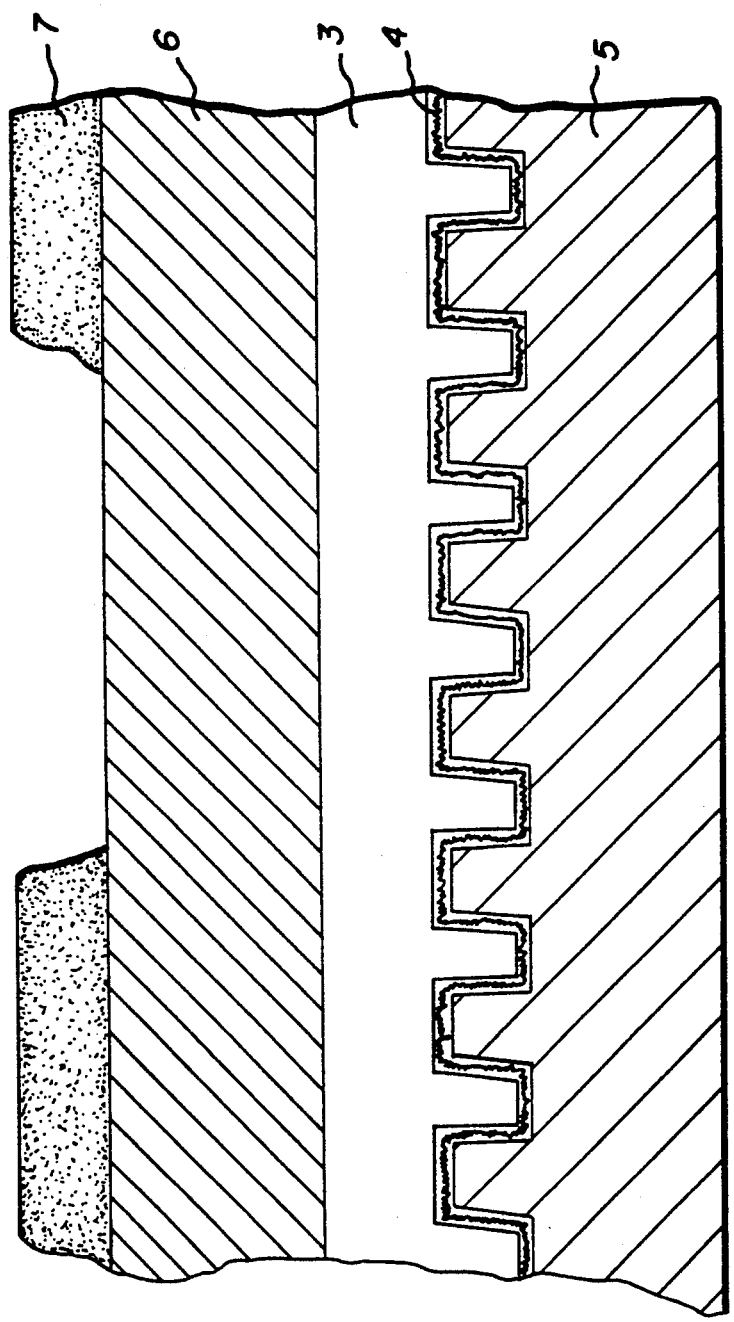
FIG. 5 is a sectional view of the product shown in FIG. 4.
Figure 6:
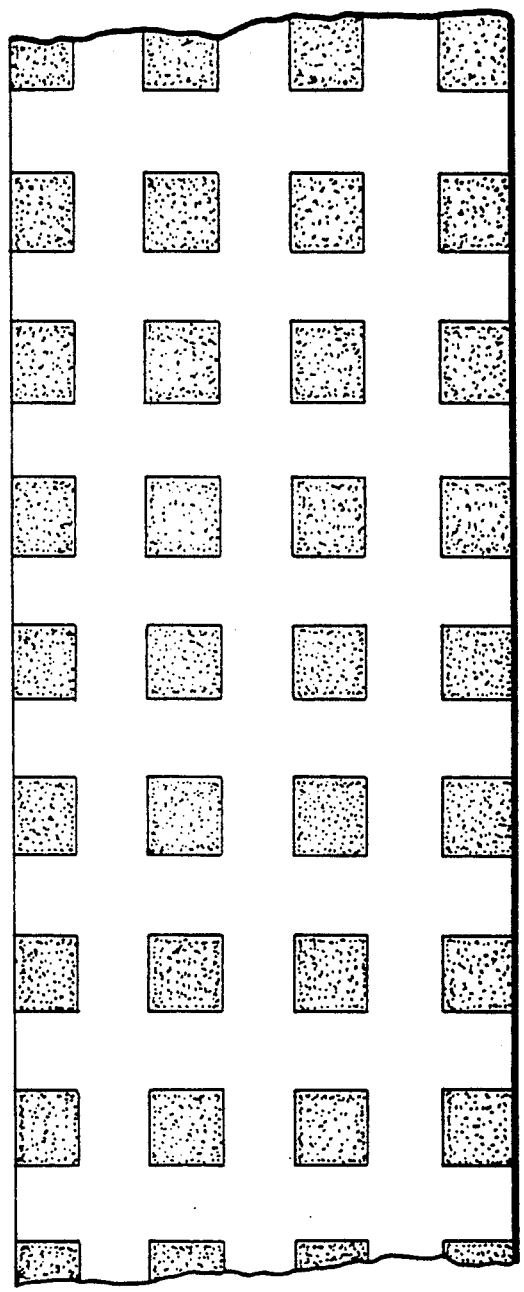
FIG. 6 is an enlarged diagrammatic view of the metal reflecting grating of the transparent glass portion without a blue coloured vitreous enamel of the product shown in FIG. 4.
Figures 7, 7A:
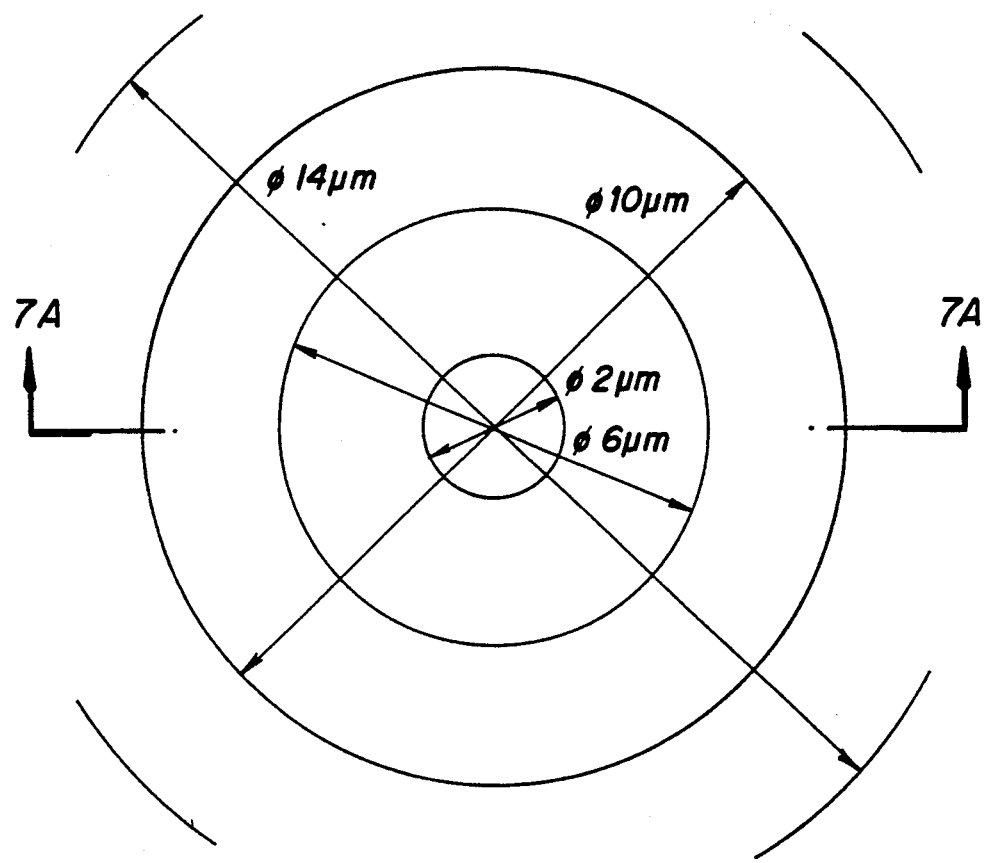

FIGS. 4, 5 and 6 show a second embodiment of the printed glass grating decorative plate of the present invention. FIG. 4 shows the substrate plane of the second embodiment, a 8 mm transparent glass plate in which the black part is the pattern formed by blue coloured vitreous enamel on the surface, and the white part is the metal reflecting layer part on the square grating visible inside the glass. It can be seen from FIG. 5 that the decorative plate is composed of a transparent strengthened plate glass (6), a layer of blue coloured vitreou enamel (7), strengthened simultaneously with the strengthened glass layer, a layr of adhered transparent epoxy resin (3), a layer of metal reflecting film (4), and a layer of protective resin (5) with grating relief. FIG. 6 shows the metal reflecting grating of the transparent glass part of the decorative plate without a blue coloured vitreous enamel. From the drawing can be seen the square gratings distributed all over with a spacing of 2 microns, the black parts being the depressed portions of the relief.

The manufacturing process of the decorative plate of the second embodiment is as follows:

A layer of pattern formed by the blue coloured vitreous enamel (7) is imprinted on the plate glass (6) by means of printing technology. After heating, sintering and tempering the layer, the side without a pattern thereof is coated with a layer of transparent epoxy resin (3). And then a protective resin layer (5) in grating relief with metal reflecting film (4) is attached to it. A plate of printed glass grating decorative panel is obtained after the resin is solidified, which can be used as floor bricks. When the above-described product of the present invention is to be compared with the prior art "holographic decorative brick" mentioned at the beginning of this application, not only the appearance is greatly improved, exhibiting fully the combining effects of grating and the artistic pattern of marble and its like, but also the ageing resistance is tenfold bettered. It is particularly suitable for use as the decoration of an exterior wall. These are what the prior art products can not compete with.

While the present invention has been described above with respect to preferred embodiments thereof, the scope of protection for this invention should not be limited only to these embodiments, but rather defined by the appended claims.

I claim:

1. A printed glass grating decorative plate comprising:
    a transparent plate glass,
    a layer of adhered resin,
    a protective resin layer in grating or holographic pattern relief with a metal reflecting film layer,
    and a layer of pattern in coloured printing ink or of vitreous enamel on said glass plate.

2. A printed glass grating decorative plate according to claim 1, wherein said transparent glass plate is of colored transparent glass.

3. A printed glass grating decorative plate according to claim 1, wherein said metal film layer is a non-transparent metal film layer.

4. A printed glass grating decorative plate according to claim 1, wherein said adhered resin layer is one of a coated layer of light sensitive material, a pressure sensitive resin layer, and a layer of resin of cross-linking molecular structure.

5. A printed glass grating decorative plate according to claim 1, wherein said protective resin layer with metal reflecting film layer is one of a layer of resin of cross-linking molecular structure and a layer of thermoplastic resin.

6. A printed glass grating decorative plate according to claim 1, wherein said pattern is one of monochromatic and of various colours superposed or combined.

7. A printed glass grating decorative plate according to claim 1, further comprising a protective layer of solid sheet material adhered to the protective resin layer.

8. A printed glass grating decorative plate according to claim 1, wherein said transparent glass plate is composed of colored transparent glass coated with heat reflecting metal film.

9. A printed glass grating decorative plate according to claim 1, wherein said transparent glass plate is composed of tempered colored transparent glass.

10. A printed glass grating decorative plate according to claim 1, wherein said metal film layer is a metal film layer coated in accordance with a specific pattern so that some portions of said glass plate are completely transparent, while other portions of said glass plate have a pattern formed by said metal film layer.

11. A printed glass grating decorative plate according to claim 1, wherein said metal film layer is a metal coated film layer, said metal coated film layer having a thickness such that its light transmissivity is between 10%-90%.

12. A printed glass grating decorative plate comprising:
    a transparent plate glass,
    a layer of adhered resin,
    a protective resin layer in grating or holographic pattern relief with metal reflecting film layer,
    and a layer of pattern in coloured printing ink or of vitreous enamel between said glass plate and said adhered resin layer.

13. A printed glass grating decorative plate according to claim 12, wherein said transparent glass plate is of colored transparent glass.

14. A printed glass grating decorative plate according to claim 12, wherein said metal film layer is a relatively thick, non-transparent metal film layer.

15. A printed glass grating decorative plate according to claim 12, wherein said adhered resin layer is one of a coated layer of light sensitive material, a pressure sensitive resin layer, and a layer of resin of cross-linking molecular structure.

16. A printed glass grating decorative plate according to claim 12, wherein said protective resin layer with metal reflecting film layer is one of a layer of resin of cross-linking molecular structure and a layer of thermoplastic resin.

17. A printed glass grating decorative plate according to claim 12, wherein said pattern is one of monochromatic or of various colours superposed or combined.

18. A printed glass grating decorative plate according to claim 12, further comprising a protective layer of solid sheet material adhered to the protective resin layer.

19. A printed glass grating decorative plate according to claim 12, wherein said transparent glass plate is composed of colored transparent glass coated with heat reflecting metal film.

20. A printed glass grating decorative plate according to claim 12, wherein said transparent glass plate is composed of strengthened colored transparent glass.

21. A printed glass grating decorative plate according to claim 12, wherein said metal film layer is a metal film layer coated in accordance with a specific pattern so that some portions of said glass plate are completely transparent, while other portions of said glass plate have a pattern formed by said metal film layer.

22. A printed glass grating decorative plate according to claim 12, wherein said metal film layer is a metal coated film layer, said metal coated film layer having a thickness such that its light transmissivity is between 10%-90%.

* * * * *

UNITED STATES PATENT AND TRADEMARK OFFICE
CERTIFICATE OF CORRECTION

PATENT NO.   :   5,294,494
DATED        :   March 15, 1994
INVENTOR     :   YANG, Dening It is certified that error appears in the above-identified patent and that said Letters Patent is hereby corrected as shown below:

Cover page, please delete, in it's entirety, item [73]. Assignee.

Signed and Sealed this

Thirteenth Day of December, 1994

Attest:

BRUCE LEHMAN

*Attesting Officer*      *Commissioner of Patents and Trademarks*